United States Patent [19]

Richter et al.

[11] Patent Number: 4,626,383

[45] Date of Patent: Dec. 2, 1986

[54] CHEMILUMINESCENT SYSTEM CATALYSTS

[75] Inventors: Herbert P. Richter; Joseph H. Johnson, both of Ridgecrest, Calif.

[73] Assignee: The United States of America as represented by the Secretary of the Navy, Washington, D.C.

[21] Appl. No.: 719,786

[22] Filed: Apr. 3, 1985

[51] Int. Cl.[4] ............................................. C09K 11/00
[52] U.S. Cl. .................................................... 252/700
[58] Field of Search ......................................... 252/700

[56] References Cited

U.S. PATENT DOCUMENTS

| | | | |
|---|---|---|---|
| 3,728,270 | 4/1973 | Bens | 252/700 |
| 3,749,679 | 7/1973 | Rauhut | 252/700 |
| 3,769,227 | 10/1973 | Carpenter et al. | 252/700 |
| 3,816,326 | 6/1974 | Bollyky | 252/700 |
| 4,076,645 | 2/1978 | Vega | 252/700 |
| 4,313,843 | 2/1982 | Bollyky et al. | 252/700 |
| 4,401,585 | 8/1983 | Arthen, Jr. et al. | 252/700 |

FOREIGN PATENT DOCUMENTS 48409  9/1984  Japan ................... 252/700

Primary Examiner—John F. Terapane
Assistant Examiner—Catherine S. Kiley
Attorney, Agent, or Firm—W. Thom Skeer

[57] ABSTRACT

Catalysts for low temperature hydrogen peroxide/oxalate ester fluorescer chemiluminescent systems are disclosed. Lithium carboxylic said salt catalysts which lower the activation energy of the reaction and also reduce the temperature dependence of the light emission process are preferred.

1 Claim, No Drawings

CHEMILUMINESCENT SYSTEM CATALYSTS

BACKGROUND OF THE INVENTION

1. Field of the Invention

This invention relates to catalysts for chemiluminescent systems. More particularly, this invention relates to catalysts for two component chemiluminescent systems wherein one component is a hydrogen peroxide component and the other component is an oxalate ester-fluorescer component.

2. Description of the Prior Art

Two component chemiluminescent systems which utilizes a reaction mixture of a hydrogen peroxide component and an oxalate ester-fluorescer component to produce light are well known. In such systems a solution of hydrogen peroxide in dimethyl phthalate or a mixture of dimethyl phthalate and t-butyl alcohol and a solution of an oxalate ester such as bis(2,4,5-trichlorocarbobutoxyphenyl) oxlate, and a fluorescer, for example 9,10-diphenyl anthracene, in a solvent such as dibutyl phthalate are mixed and allowed to react whereupon light is produced.

In two component chemiluminescent systems of the type described, a catalyst is generally included as part of the hydrogen peroxide component. Many catalysts have been tried. Of the catalysts tried, sodium salicylate and various tetraalkylamminoum salicylates have been the most widely used.

Sodium salicylate and tetraalkylammonium salicylates are excellent catalysts for chemiluminescent systems of the type described. However, they have certain disadvantages. First, they are not highly soluble in mixtures of dimethyl phthalate and t-butyl alcohol which are the most commonly used solvents for the hydrogen peroxide component. Because of their relatively low solubility, systems which will produce short duration high intensity light cannot be produced. Short duration, high intensity light systems require fairly large concentrations of catalyst. Second, even at relatively low concentrations, sodium salicylate and the tetraalkylammonium salicylates tend to precipitate out of dimethyl phthalate and mixtures of dimethyl phthalate and t-butyl alcohol at low temperatures. This is obviously undesirable when one realizes that chemiluminescent devices may be required to operate at low temperatures.

SUMMARY OF THE INVENTION

It has now been found that lithium carboxylic acid salts and especially lithium salicylate, lithium 5-t-butyl salicylate and lithium 2-chlorobenzoate are excellent catalysts for low temperature hydrogen peroxide/oxalate esterfluorescer chemiluminescent systems. The catalysts of this invention are much more soluble in the commonly used solvents for the hydrogen peroxide component and especially in the solvents 3-methyl-3-pentanol or a solvent mixture cf 3-methyl-3-pentanol and t-butanol to achieve a significant improvement in low temperature performance as well as higher intensity from the oxalate esterhydrogen peroxide-fluorescer chemiluminescent systems. The lithium carboxylic acid salts as catalysts lower the activation energy of the reaction and thus reduce the temperature dependence of the light emission process. The lithium carboxylic acid salts show a reduced variation of light output performance in chemiluminescent systems as a function of temperature than the commonly used sodium salts such as sodium salicylate or sodium trifluoroacetate.

DESCRIPTION OF THE PREFERRED EMBODIMENT

In tests, a series of chemiluminescent systems of the type described above in which the catalyst was either sodium salicylate, sodium trifluoroacetate or tetrabutylammonium salicylate dissolved in the solvent of the hydrogen peroxide component were compared with a series of chemiluminescent systems in which a member of the group of catalysts consisting of lithium salicylate, lithium 5-t-butyl salicylate, and lithium 2-chlorobenzoate was used to replace the salicylate catalysts. The concentration of the lithium carboxylic acid salt catalyst in the hydrogen peroxide component is in the range of from about $1 \times 10^{-4}$M to about $2 \times 10^{-2}$M. The concentrations of reactants were held constant where possible to compare changes due to catalyst structure. In comparing the three lithium catalysts to sodium salicylate for example, the lithium salt system light yields are approximately 160%, 550%, and 900% greater at +23°, 0° and −20° C., respectively.

The following examples are illustrative of the present invention. All parts are by weight unless otherwise indicated.

EXAMPLES 1-7

Determination of Chemiluminescence

Each catalyst (defined in Table 1) in the indicated concentration was tested in a solution of 0.133M bis(2,4,5-trichloro-6-carbopentoxyphenyl) oxalate, $5,63 \times 10^{-3}$M 2-ethyl-9,10-bis(phenylethynyl)anthracene, 0.375M hydrogen peroxide and a solvent mixture of dibutylphthalate with 3-methyl-3-pentanol or dimethylphthalate/t-butanol. The results are shown in Table 1.

TABLE 1

| Catalyst and conc. | +23° C. (73° F.) | | | 0° C. (32° F.) | | | −20° C. (−4° F.) | | | −32° C. (−25° F.) | | |
|---|---|---|---|---|---|---|---|---|---|---|---|---|
| | Q30, | Q60, | QT | Q30, | Q60, | QT | Q30, | Q60, | QT | Q30, | Q60, | QT |
| Lithium salicylate $7.5 \times 10^{-3}$ M | 305, | 320, | 320 | 163, | 201, | N/A | 93, | N/A, | N/A | 26, | 44, | N/A |
| Lithium 5-t-butyl salicylate $7.5 \times 10^{-3}$ M | 310, | N/A, | N/A | 150, | N/A, | N/A | 74, | N/A, | N/A | | N/A | |
| Lithium 2-chlorobenzoate $5 \times 10^{-3}$ M | 285, | N/A, | N/A | 143, | N/A, | N/A | 71, | N/A, | N/A | | N/A | |
| Sodium salicylate $2.5 \times 10^{-4}$ M | 160, | 291, | 650 | 29, | 45, | 205 | 11, | 14, | 22 | 7, | 8, | 17 |
| Sodium trifluoroacetate $1.25 \times 10^{-2}$ M | 590, | 590, | 590 | 176, | 266, | 410 | 20, | 37, | 211 | 4, | 7, | 110 |
| Tetrabutylammonium salicylate $2.5 \times 10^{-4}$ M | 197, | 342, | 600 | 52, | 73, | 426 | 36, | 46, | 66 | 9, | 17, | 44 |

Q30 is the light yield during the first 30 minutes after mixing the system at the indicated temperature in units of lumin hours per liter. Q60 is the yield in 60 minutes and QT is the total yield.

As indicated in Table 1, the catalysts of this invention offer improved performance over sodium salicylate, sodium trifluoroacetate and tetrabutylammonium salicylate, catalyzed systems. The lithium salts give approximately 7 to 9 times higher yields at $-20°$ C. ($-4°$ F.) and extend usefulness of the chemical light to even lower temperatures.

It is within the scope of this invention to make such modifications of the compositions and processes disclosed herein as would be obvious to person of ordinary skill in this art, and it is to be understood that the examples illustrating this invention are intended to limit the invention only insofar as is stated in the specification and as the following claims are limited.

What is claimed is:

1. In a method for producing light in short duration, high intensity systems and low temperature systems having the steps of bringing a hydrogen peroxide component containing a catalyst and a solvent and an oxalate ester-fluorescent component together and allowing said components to react to produce said light, the improvement comprising in utilizing as said catalyst a lithium carboxylic acid salt selected from the group consisting of lithium salicylate, lithium 5-t-butyl salicylate and lithium 2-chlorobenzoate.

* * * * *